United States Patent [19]

Guida et al.

[11] Patent Number: 5,315,617
[45] Date of Patent: May 24, 1994

[54] QAM ENCODING FOR HIGH-DEFINITION TELEVISION SYSTEM

[75] Inventors: Allan A. Guida, East Windsor; Krishnamurthy Jonnalagadda, Plainsboro, both of N.J.

[73] Assignee: General Electric Company, Princeton, N.J.

[21] Appl. No.: 889,805

[22] Filed: May 29, 1992

[51] Int. Cl.⁵ .................. H03D 1/00; H04L 27/06
[52] U.S. Cl. ........................... 375/39; 375/94; 348/441
[58] Field of Search .............. 375/39, 94; 329/304; 332/103; 358/114; 370/110.1, 110.4; 371/30, 41, 43, 37.6

[56] References Cited

U.S. PATENT DOCUMENTS

| | | | |
|---|---|---|---|
| 4,084,137 | 4/1978 | Welti | 325/30 |
| 4,562,426 | 12/1985 | Forney, Jr. | 340/347 |
| 4,630,287 | 12/1986 | Armstrong | 375/39 |
| 5,115,453 | 5/1992 | Calderbank et al. | 375/39 |
| 5,124,656 | 5/1993 | Chung et al. | 375/39 X |

FOREIGN PATENT DOCUMENTS

0122805 10/1984 European Pat. Off.
WO92/14343 8/1982 PCT Int'l Appl.

OTHER PUBLICATIONS

Ser. No. 650,329, filed Feb. 4, 1991, "Modulator/Demodulator for Compatible High Definition Television System" by H. E. White.

Wu, "Combination of block-coded modulation and trellis-coded modulation", IEEE Proceedings, vol. 138, No. 5, Oct. 1991, pp. 381-386.

Block Coded Modulation: Novel Design Techniques & Rotational Invariance, by A. Chouly et al., Philips Journal of Research, vol. 45 (1990) Sep. No. 2, Eindhoven, NL.

Patent Abstracts of Japan, vol. 16, No. 11 (E-1153) Jan. 13, 1992 & JP, A, 32 32 320 Matsushita, Oct. 16, 1991.

IEEE/IEICE Global Telecommunications Conference, Nov. 15-18, 1987, vol. 3/3, Tokyo, JP, pp. 1477-1484, Kanno et al., "Fiber Optic Broadband Visual Signals Transport Employing High-Level QAM".

"Odd-Bit Quadrature Amplitude Shift Key" by J. G. Smith, pp. 385-389 of IEEE Trans. Comm. Tech., Mar. 1975.

"Digital Communication" by Lee & Messerschmitt (Kluwer Academic Publishers), Boston, Mass. 1988.

Primary Examiner—Stephen Chin
Assistant Examiner—Bryan Webster
Attorney, Agent, or Firm—Joseph S. Tripoli; Eric P. Herrmann; Ronald H. Kurdyla

[57] ABSTRACT

An encoding scheme resistant to transmission errors encodes a data bitstream for application to a quadrature amplitude modulator (QAM) in a high definition television system. The error-resistant code provides a rotationally symmetrical 32-point constellation on a plane defined by I,Q quadrature axes. The constellation is divided into first and second partitions arranged so that constellation points that are closest in distance to any constellation point of the first partition belong to the second partition, and constellation points that are closest in distance to any constellation point of the second partition belong to the first partition. The binary value of one bit of each of successive 9-bit packets in the bitstream determines that one of the two partitions to which both of a consecutive pair of first and second constellation-point transmissions belong (the first and second transmitted constellation-points of that consecutive pair being selected by the then current 9-bit packet of the stream). The code is such that the binary values of such one bit of each of alternate ones of the successive 9-bit packets are opposite to one another. This permits a receiver decoder to decide whether each received constellation-point belongs to a first or a second constellation, thereby permitting the detection and, in most cases, the correction of transmission errors.

17 Claims, 6 Drawing Sheets

```
                    90° (Q)
          00000  01100 | 00001  01111
            o      •   |   o      •
    10111 11101 10110 |11010 10101 11000
      o     •     o   |   •     o     •
    01001 00010 01011 |00011 01110 00100
      •     o     •   |   •     •     o
180° ─────────────────┼───────────────── 0° (I)
            o    •   o |  •   o    •
          10100 11110 10011|01110 10010 11001
            •    o   •  |  o   •    o
          01000 00101 01010|00110 01101 00111
                 •   o  |  •   o
               11111 10001|11100 10000
                    270°
```

PARTITIONS A & B

QAM ENCODING FOR HIGH-DEFINITION TELEVISION SYSTEM

FIELD OF THE INVENTION

The present invention relates to an encoder for encoding a stream of information data bits to be applied to a quadrature amplitude modulator (QAM). In particular, the invention concerns such an encoder and associated decoder employed in a high-definition television system.

DESCRIPTION OF THE PRIOR ART

Simulcast broadcast of 6 MHz channel-bandwidth television signals employing both a standard (NTSC) analog format and a high-definition television (HDTV) digital format has been proposed. The HDTV format requires (1) that the television data be processed into a data-compressed form in order to fit within a standard 6 MHz channel, and (2) that the HDTV format be chosen to minimize interference with an NTSC-format signal being simultaneously broadcast over the same channel as an HDTV-format signal. An HDTV transmitter and receiver system designed for simulcast broadcasting, which employs QAM and which meets both of the two aforesaid requirements, is disclosed in copending U.S. patent application Ser. No. 07/650,329, filed Feb. 4, 1991, which is assigned to the same assignee as the present application.

In such disclosed HDTV system, the digital QAM channel signal at the transmitter is converted to analog form before being transmitted over the air to the receiver, where it is converted back to digital form. Because of transmission factors such as noise, errors can occur that cause the received QAM signal not to exactly match the transmitted QAM signal.

SUMMARY OF THE INVENTION

The present invention concerns apparatus for encoding a QAM signal so as to provide a high degree of error resistance by permitting transmission errors to be detected and, in most cases, corrected at the receiver. This encoding technique may be advantageously used in an HDTV system.

The error resistant encoding scheme according to the present invention provides a given rotationally symmetrical constellation of between $2^{n-1}+1$ and $2^n$ points in a plane defined by I,Q quadrature axes, where n is an integer having a value of at least 4. The constellation is divided into first and second separate, distinguishable partitions arranged so that constellation points that are closest in distance in the I,Q plane to any constellation point of the first partition belong to the second partition, and constellation points that are closest in distance to any constellation point of the second partition belong to the first partition.

More specifically, the present invention concerns an improved encoding scheme for the encoder of video signal transmitter apparatus comprising digital means including a quadrature-amplitude modulator (QAM) and the encoder therefor. The QAM derives any particular point in a given rotationally symmetrical constellation of between $2^{n-1}+1$ and $2^n$ points in the I,Q plane in response to that particular point being selected by the encoder in accordance with an n-segment code, where n is an integer having a value of at least 4. The encoder assigns an n-bit segment having a unique binary value to each individual point of the constellation, in which the n-bit segment comprises (1) two phase bits for distinguishing each of four rotationally symmetrical sets of between $2^{n-3}+1$ and $2^{n-2}$ constellation points situated respectively in each of the four quadrants of the I,Q plane in accordance with different ones of the four binary values defined by the two phase bits, and (2) n−2 invariant bits for distinguishing each of the constellation points in a rotationally-symmetrical set in accordance with different ones of the binary values defined by the n−2 invariant bits, thereby providing insensitivity to rotation of the constellation.

The bit assignment provided by the encoding scheme of the present invention is such that the constellation points are divided into first and second separate partitions arranged so that constellation points that are closest in distance in the I,Q plane to any constellation point of the first partition belong to the second partition, and constellation points that are closest in distance in the I,Q plane to any constellation point of the second partition belong to the first partition. The first and second partitions are distinguishable from one another by the lowest significant phase bit of all n-bit segments belonging to the first partition having a certain binary value, and all n-bit segments belonging to the second partition having a binary value opposite to the certain binary value.

A decoder in a QAM receiver includes digital means for deciding, in accordance with a given program, whether a first of a pair of first and second constellation points in the I,Q plane consecutively received by the receiver is a first-partition constellation point or, alternatively, is a second-partition constellation point.

DETAILED DESCRIPTION OF THE DRAWING

Figure 1:
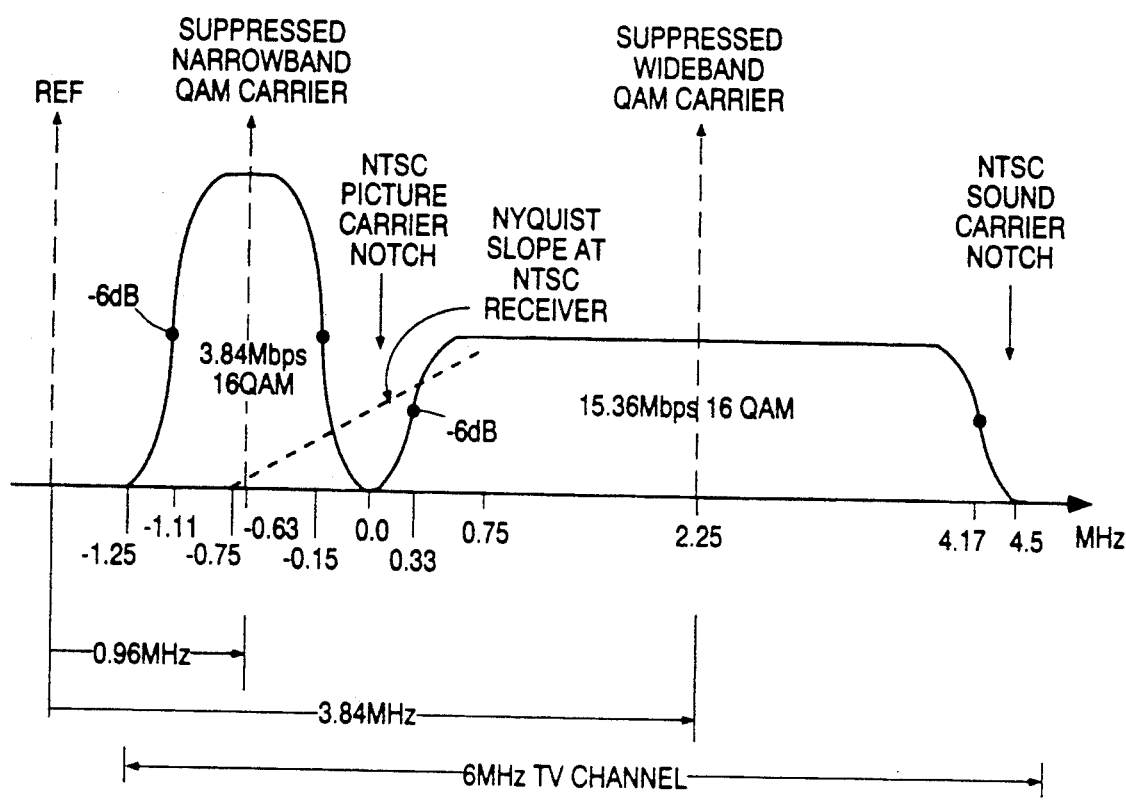
FIG. 1 shows the 6 MHz channel bandwidth spectrum of a proposed prior art HDTV system.

Referring to FIG. 1, there is shown the 6 MHz bandwidth spectrum of a TV-channel, with respect to an out-of band reference frequency, employed by the proposed HDTV system disclosed in the aforesaid U.S. patent application Ser. No. 07/650,329. As indicated, the 6 MHz bandwidth comprises a relatively high-amplitude suppressed narrowband QAM component, centered 0.96 MHz above the reference frequency, which is used to convey low frequency video, audio and synchronizing information (i.e., high-priority information). A relatively low-amplitude suppressed wideband QAM component, centered 3.84 MHz above the reference frequency, is used to convey high frequency video (i.e., low-priority information). As will be discussed in more detail below, each of successive 4-bit packets of an ongoing 3.84 megabits per second (Mbps) data stream are used to select one out of a constellation of sixteen predetermined points in a first in-phase (I), quadrature (Q) plane for use by the narrowband QAM component. In a similar manner, each of successive 4-bit packets of an ongoing 15.36 megabits per second (Mbps) data stream are used to select one out of a constellation of sixteen predetermined points in a second in-phase (I), quadrature (Q) plane for use by the wideband QAM component.

Figure 2:
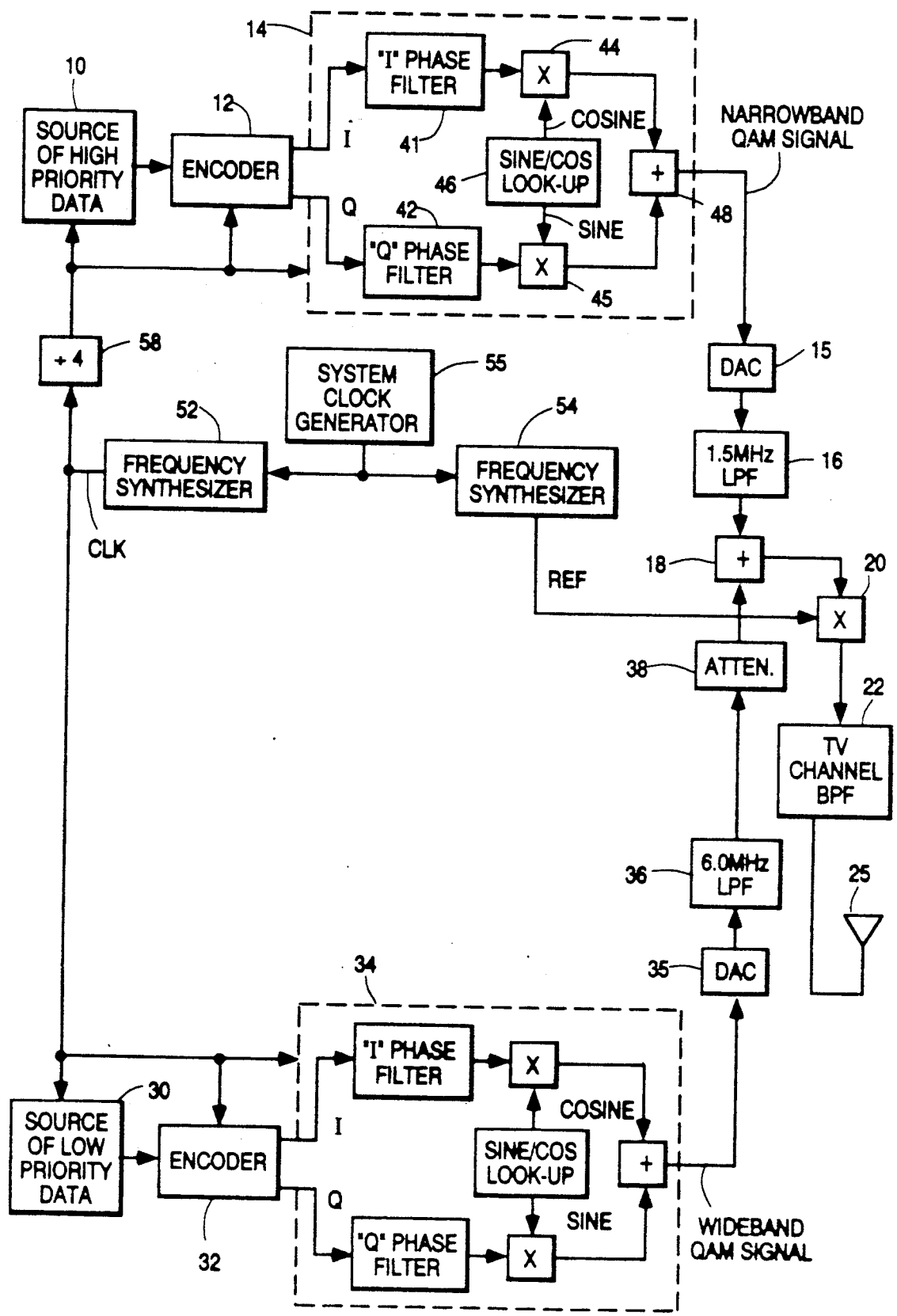
FIG. 2 is a block diagram of the QAM transmitter employed by the proposed prior art HDTV system.

FIG. 2 is a block diagram of the transmitter employed by the proposed HDTV system disclosed in aforesaid patent application Ser. No. 07/650,329. FIG. 2 shows television transmitter apparatus for developing a twin QAM signal having the amplitude-versus-frequency spectrum shown in FIG. 1. High priority and low priority HDTV data are provided from sources 10 and 30 in time compressed digital form to be compatible with the 6 MHz bandwidth of a standard NTSC channel. For this purpose, sources 10 and 30 contain digital data compression and encoding apparatus including Huffman coding, run-length coding, quantizing and discrete cosine transformation networks, for example.

Figure 4A:
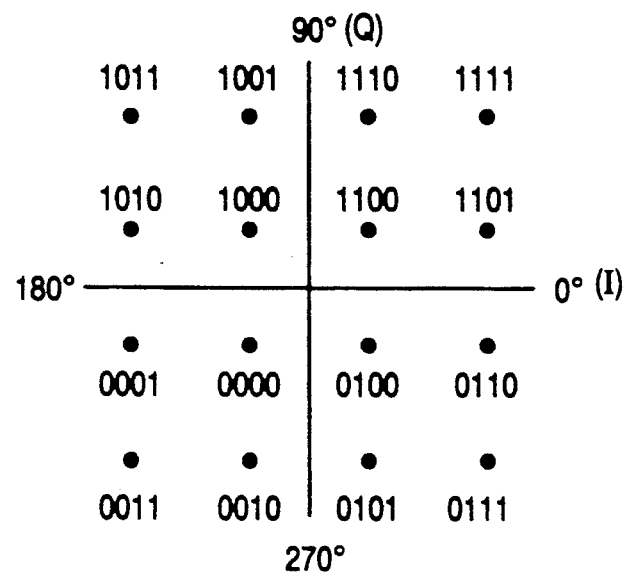
FIG. 4a illustrates the bit assignment of the prior art 16-point constellation employed by the encoder of the QAM transmitter shown in FIG. 2.

The output signal from source 10 is applied to an encoder 12, which acts as a bit-mapper for the continuous bit stream signal received from source 10. Encoder 12 splits the signal from source 10 into sequential 4-bit (symbol) packets. One 16-value, 4-bit packet is mapped into a four quadrant signal constellation using a look-up table, with four 4-bit values occupying assigned areas in each quadrant. FIG. 4a illustrates such a bit assignment for a 16-bit QAM signal constellation with respect to a four quadrant grid with real (I) and imaginary (Q) quadrature axes. This mapped bit segment appears at I and Q outputs of encoder 12 (e.g., the first two bits appear at the I output and the next two bits appear at the Q output). The next value, 4-bit packet is similarly mapped. To allow a receiver to be insensitive to a phase rotation of the received signal constellation, a form of differential encoding is used at the transmitter whereby the first two bits of each four bit segment are phase bits that select the constellation quadrant in which a particular four-bit segment is located, and the last two bits are invariant bits, which are the same for each of the four quadrants, and are used to select the particular point within that quadrant selected by the phase bits. Encoder 32 operates in the same manner with respect to signals received from low priority data source 30.

The output signals from encoders 12 and 32 are applied to respective QAM modulators 14 and 34 of conventional design. A narrowband QAM output signal from modulator 14 is converted to analog form by a digital-to-analog converter before being applied to an input of an additive combiner 18 via a 1.5 MHz horizontal low pass filter 16. Filter 16 removes unwanted high frequency components including harmonics produced by prior digital processing and digital-to-analog conversion circuits in the narrowband path. A wideband QAM output signal from modulator 34 is converted to analog form by a digital-to-analog converter 35 before being applied to another input of combiner 18 via a 6.0 MHz horizontal low pass filter 36 and an attenuator 38. Filter 36 serves essentially the same purpose as filter 16. Attenuator 38 scales the amplitude of the wideband QAM component so that it is −6 db less than the amplitude of the high priority narrowband QAM component, as illustrated in FIG. 1. A composite twin QAM signal is produced at the output of combiner 18. This twin QAM signal is multiplied by a reference signal REF in a modulator (mixer) 20 to produce signal REF double sideband modulated with upper and lower twin QAM sidebands at the output of modulator 20. A 6 MHz TV channel bandpass filter 22 rejects the lower sideband, but retains the upper sideband (FIG. 1) for transmission via apparatus including an antenna 25.

QAM modulator 14 contains identical square root raised cosine, finite impulse response (FIR) digital filters 41 and 42 which receive the I and Q output signals from encoder 12, respectively. Filter 41 is located in a nominal in-phase path and is designated as an "I" phase filter, whereas filter 42 is located in a nominal quadrature-phase path and is designated as a "Q" phase filter. Filters 41 and 42 shape the nonlinear band edge transition regions of the narrowband and wideband QAM components shown in FIG. 1. Output signals from filters 41 and 42 are respectively modulated in multipliers 44 and 45 with COSINE and SINE reference signals. These signals are provided from a source 46, e.g., including a look-up table which produces sine and cosine values at four 90° intervals per period, namely, 90°, 180°, 270° and 360°. The SINE and COSINE reference signals correspond to the narrowband QAM suppressed quadrature carrier at a frequency of 0.96 MHz, i.e., 3.84 Mbps/4. Quadrature phased modulated output signals from multipliers 44 and 45 are combined by an adder 48 to produce the high priority narrowband QAM signal. Wideband QAM modulator 34 is structurally and operationally similar to modulator 14, except that the frequency of the associated SINE and COSINE quadrature carrier signals is 3.84 MHz.

The timing of the system shown in FIG. 2, which employs 2's complement 8-bit digital signal processing, is controlled by digital data clock signals provided by frequency synthesizers 52 and 54 in response to a master clock signal developed by a system clock generator 55. A 15.36 MHz clock signal CLK from synthesizer 52 acts as the data clock for data source 30, encoder 32 and wideband QAM modulator 34. Clock CLK also serves as the data clock for data source 10, encoder 12 and narrowband QAM modulator 14 after being frequency divided to 3.84 MHz by a divide-by-four frequency divider 58, since the data rate of the narrowband data (3.84 Mbps) is one-quarter that of the wideband data (15.36 Mbps). Synthesizer 54 provides a reference signal REF for translating the composite twin QAM signal to the television frequency band via mixer 20.

The narrowband and wideband QAM carriers need not be suppressed, although the use of suppressed carriers provides power savings and avoids certain types of interference in a displayed image. Small amplitude non-suppressed carriers may be used to provide improved symbol rate clock recovery. Modulated QAM carriers with unsymmetrical sidebands are also possible.

Figure 3:
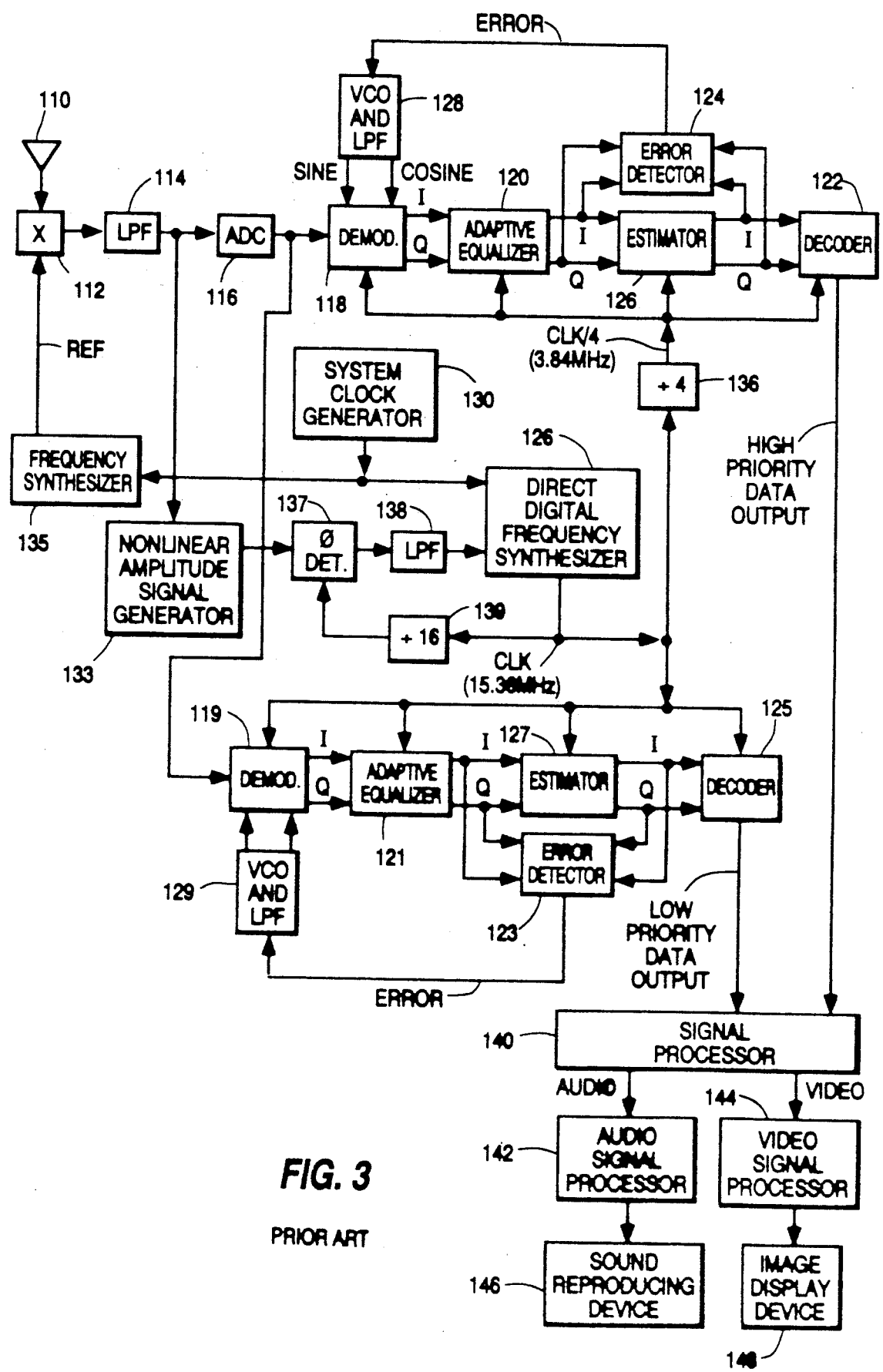
FIG. 3 is a block diagram of the QAM receiver employed by the proposed prior art HDTV system.

Referring to FIG. 3, there is shown a block diagram of the receiver employed by the proposed HDTV system disclosed in the aforesaid U.S. patent application Ser. No. 07/650,329. As indicated, FIG. 3 shows television receiver apparatus in which a broadcast twin QAM signal received by an antenna 110 is applied to a mixer 112 together with a reference signal REF nominally at the frequency of signal REF used at the transmitter. An output signal from mixer 112 includes sum and difference components. The higher frequency sum component is rejected by a low pass filter 114, which passes the difference component to an analog to digital converter 116. The passed difference component exhibits the composite modulation frequency spectrum shown in FIG. 1, with the narrowband QAM modulation spectrum centered about 0.96 MHz and the wideband QAM modulation spectrum centered about 3.84 MHz. The digital sampled output signal from unit 116 is applied to a demodulator 118 which, together with succeeding elements 120, 122, 124, 126 and 128 forms a narrowband QAM signal processor.

Demodulator 118 includes a plurality of input FIR filters for selectively passing the narrowband QAM component, while rejecting the wideband QAM component. Specifically, narrowband QAM demodulator 118 includes a filter having an amplitude versus frequency response characteristic which substantially conforms to the shape of the amplitude versus frequency characteristic of the modulated narrowband QAM component as shown in FIG. 2. A demodulator 119 in a wideband QAM signal processing network including elements 119, 121, 123, 125, 127 and 129 selectively passes the wideband QAM component while rejecting the narrowband QAM component. Wideband QAM demodulator 119 includes a filter having a response which substantially conforms to the shape of the amplitude versus frequency characteristic of the modulated wideband QAM component, as shown in FIG. 1. Thus the receiver system exhibits signal attenuating notches at frequencies associated with high energy information in a standard definition television signal. The elements of the wideband QAM processor are similar to the correspondingly labeled elements of the narrowband processor which will be discussed below, except that the characteristics of demodulators 118 and 119 differ as mentioned above. Demodulators 118 and 119 perform the inverse of the operation performed by modulators 14 and 34 at the transmitter (FIG. 2).

Adaptive equalizer 120, of conventional design, receives the demodulated quadrature phased I and Q components from demodulator 118. Equalizer 120 employs an adaptive digital FIR filter to compensate for amplitude and phase irregularities, e.g., including ghosts, caused by the transmission channel. Equalizer I and Q output signals from unit 120 are applied to an estimator network 126 which produces output I, Q components which represent a most likely estimate of the values of I and Q components as transmitted. For example, the values of the I and Q components at the output of estimator 126 have been adjusted as needed to compensate for the distorting effect of noise acquired in the course of transmission. Estimator 126 essentially performs an interpretive function of assigning values to samples which, due to effects such as noise, do not fit exactly into assigned locations in the 16-point four quadrant signal constellation. Output signals from estimator 126 are applied to a decoder 122, which essentially exhibits the inverse of the mapping operation performed by the encoder at the transmitter. Look-up tables are employed to "unmap" the four quadrant signal constellation into the sequential four-bit (symbol) partitions, in binary digit form, which existed at the transmitter before being encoded at the transmitter by unit 12 (FIG. 2).

An error detector 124 monitors the I, Q input and output signals of estimator 126 for producing an output signal with a magnitude proportional to the phase error between the I, Q input and output signals of estimator 126. The phase error can be due to noise effects, in which case the phase error would be random in nature. The phase error also can be due to the frequency of signal REF not being substantially equal to the frequency of corresponding signal REF used at the transmitter, in which case the phase error would not be random in nature. An output ERROR signal from error detector 124 ultimately is used to compensate for the frequency of signal REF deviating from a desired value, i.e., the value of the frequency of corresponding signal REF at the transmitter. Specifically, the ERROR signal is applied to a voltage controlled oscillator (VCO) network 128, which also includes a low pass filter, for modifying the values of quadrature phased sine and cosine reference signals applied to quadrature demodulator. The modified sine and cosine reference signals alter the demodulation process until the magnitude of the error representative output signal from detector 124 indicates that any deviation of the frequency of signal REF from a desired value has been compensated for. The low pass filter associated with unit 128 filters the ERROR signal so that the values of the reference signals from VCO 128 and thereby the operation of demodulator 118 are modified in response to errors of a non-random nature, such as the described frequency deviation, and are unaffected by random effects such as noise. The control loop including units 119, 121, 127, 123 and 129 of the wideband QAM processor operate in the same fashion as units 118, 120, 126, 124 and 128 of the narrowband QAM processor discussed above. Additional information concerning the operation of a control loop of the type including estimator 126, detector 124, VCO 128 and demodulator 118 can be found in the text "Digital Communication", Lee and Messerschmitt, (Kluwer Academic Publishers, Boston, Mass., USA, 1988).

A direct digital frequency synthesizer 126 produces a clock signal CLK in response to a master clock signal from a system clock generator 130, which also provides a clock signal to a frequency synthesizer 135 for developing mixer reference signal REF. The frequency of signal REF nominally corresponds to that of signal REF used at the transmitter. Any deviation of the frequency of signal REF from a desired frequency is compensated for as described above. Signal CLK from source 126 is the clock signal for elements 119, 121, 125 and 127 of the wideband processor. The narrowband processor processes a signal with a bandwidth which is one-fourth that of the wideband signal. Hence, the narrowband processor elements respond to a clock signal CLK/4 with a frequency one-fourth that of signal CLK, as provided by a frequency divider 136. The frequency of clock signal CLK at the receiver corresponds to the frequency of clock signal CLK employed at the transmitter (FIG. 2). Establishing the proper receiver clock frequency is facilitated by deriving the receiver clock signal from information contained in the more reliably received high power narrowband QAM component. Specifically, the composite QAM signal from the output of LPF 114 is applied to a nonlinear signal generator 133, e.g., a power of N generator where N may be 2 or 4. Unit 133 produces a single frequency component at the symbol rate of the narrow-band QAM component. In this case, the symbol rate is 0.96 MHz, one-quarter of the bit rate. Unit 133 also produces a highly attenuated output at the symbol rate of the low power wideband QAM component, which output is ignored by subsequent signal processing units. A phase detector 137 responds to the 0.96 MHz output component from unit 133, and forms a phase locked loop together with a low-pass filter 138, synthesizer 126 and a divide-by-16 frequency divider 139. Filter 138 removes spurious frequencies including noise produced by the operation of nonlinear signal generator 133. Frequency divider 139 receives a 15.36 MHz signal from synthesizer 126 and provides a 0.96 MHz output signal to a control input of phase detector 137. Synthesizer 126 includes a register which accumulates phase increments determined by the signal applied to a control input of unit 126 from filter 138, at a rate determined by the frequency of the signal from clock generator 130. The accumulated phase value addresses a ROM containing sinusoidal values which synthesize the output signal from unit 126. The function of unit 126 can be implemented by integrated circuit type Q2334 commercially available from Qualcomm Corporation of San Diego, Calif.

A signal processor 140 combines the demodulated high priority data signal from decoder 122 the demodulated low priority data signal from decoder 125. Processor 140 may include data decompression networks such as Huffman decoders and inverse quantizers, error correcting networks, and demultiplexing and signal combining networks for providing separate audio and video television signal components. The audio component is processed by an audio signal processor 142 before being applied to a sound reproducing device 146. The video component is processed by a unit 144 to produce an image representative signal which is applied to an image display device 148.

The QAM encoder of the HDTV transmitter contemplated by the present invention employs a 32-point constellation (shown in FIG. 5a), rather than the 16-point constellation (shown in FIG. 4a) employed by QAM encoder 12 of the HDTV transmitter of the prior art shown in FIG. 2, in order to substantially increase the ability of the receiver to detect and correct transmission errors. In other respects, the transmitter contemplated by the present invention is substantially similar to the above-described transmitter shown in FIG. 2. However, the principles employed in making bit assignments for the 32-point constellation (shown in FIG. 5a) is altogether different from the principles employed in making bit assignments for the 16-point constellation (shown in FIG. 4a).

As described above, the bit-assignment principles employed by the prior art for the FIG. 4a 16-point constellation allow a receiver to be insensitive to a phase rotation of the received signal constellation. Specifically, each of the 4 binary values defined by the 2 most significant bits (phase bits) of each of the 16 point-designating 4-bit segments, shown in FIG. 4a, defines a different one of the 4 quadrants of the I,Q plane. Therefore, rotation of the I,Q plane by 90°, 180° or 270° will change the position of the 4 quadrants accordingly. However, each of the 4 binary values defined by the 2 least significant bits (invariant bits) of each of the 16 point-designating 4-bit segments, shown in FIG. 4a, defines a different one of a set of 4 constellation points that are the same for each of the 4 quadrants. Further, the binary values of the invariant bits of each of the 4 sets are symmetrically arranged so that they do not change in relative position within a quadrant in response to rotation of the I,Q plane by 90°, 180° or 270°. Thus, it is the bit assignment of the phase bits, used for differentiating each of the 4 quadrants, that is employed by the prior art to render the received signal constellation insensitive to phase rotation by 90°, 180° or 270°.

It is plain that the bit-assignment principles employed by the prior art could be extended to a 32-point constellation by employing 5-bit segments comprising 2 phase bits and 3 invariant bits. In this case, the 2 phase bits still would be used for differentiating each of the 4 quadrants, and each of the 8 binary values of the 3 invariant bits would define a different one of a set of 8 constellation points that are the same for each of the 4 quadrants.

Transmission noise and other phenomena may cause the I and Q values of a received constellation point in the I,Q plane to depart somewhat from the I and Q values of the corresponding transmitted constellation point in the I,Q plane, thereby introducing error. It is for this reason that the above-described HDTV receiver, shown in FIG. 3, includes error-correcting elements 120, 124, 126 and 128 for demodulator 118. Such error-correcting elements in the receiver operate on the assumption that particular one of the 16 constellation points that has I and Q values in the I,Q plane closest to those of the received constellation point is the one that corresponds to the transmitted constellation point. However, should the transmission noise be sufficient to cause the I and Q values of a received constellation point of the 16 constellation points of FIG. 4a to be closest to those of a constellation point adjacent to the correct corresponding transmitted constellation point, rather than to the correct corresponding transmitted constellation point itself, prior-art error-correcting means, such as elements 120, 124, 126 and 128 for demodulator 118, will fail to correct this type of error.

Figures 5A, 5B:
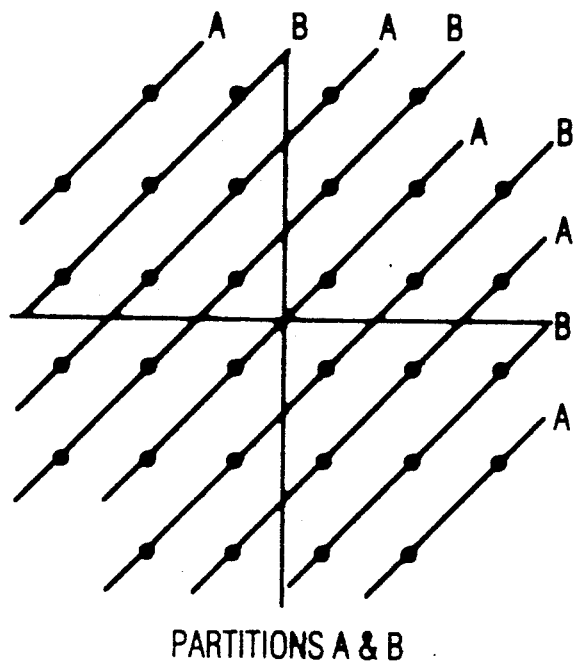
FIGS. 5a and 5b illustrate the manner in which the bit assignment of a 32-point QAM constellation employed by a modified encoder of the QAM transmitter shown in FIG. 2 is arranged into separate first and second partitions of 16 constellation points apiece in accordance with the encoding principles of the present invention.

The present invention, by employing the novel bit assignment for a 32-point constellation shown in FIGS. 5a and 5b, permits correction of transmission-noise error sufficient to cause the I and Q values of a received constellation point in the I,Q plane to be closest to those of a constellation point adjacent to the corresponding transmitted constellation point.

FIGS. 5a and 5b show a constellation comprising 32 points in the I,Q plane arranged in a 6×6 square grid defined by an array of I values between −3 and +3 and Q values between −3 and +3. No constellation points occupy the four corner I,Q points +3,+3; +3,−3; −3,−3; and −3,+3 of the square grid. The 32-point constellation of FIGS. 5a and 5b is divided into 16 partition A constellation point (indicated by white-filled "open" circles in FIG. 5a) and 16 partition B constellation points (indicated by black-filled circles in FIG. 5a). Each of the separate points of this 32-point constellation is defined by a unique 5-bit segment comprising 2 phase bits and 3 invariant bits, in which the lower significant phase bit (the second bit from the left of each 5-bit segment) of all 16 constellation points belonging to partition A has a binary value ZERO and the lower significant phase bit of all 16 constellation points belonging to partition B has a binary value ONE. As shown in FIG. 5b, the respective constellation points of partitions A and B are arranged on interleaved diagonal stripes so that constellation points that are closest in distance in the I,Q plane to any constellation point of the A partition belong to the B partition, and constellation points that are closest in distance in the I,Q plane to any constellation point of the B partition belong to the A partition. In this manner, both the distance in the I,Q plane between two adjacent A-partition constellation points and the distance in the I,Q plane between two adjacent B-partition constellation points are maximized.

Figure 4B:
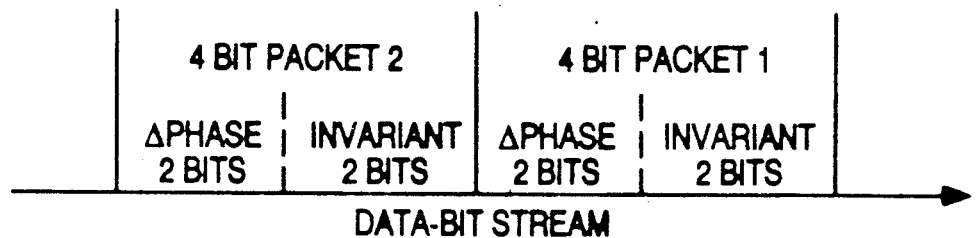
FIG. 4b illustrates the prior art manner in which an ongoing stream of information data bits applied as an input to the encoder of the QAM transmitter shown in FIG. 2 is divided into successive 4-bit packets for selecting the particular points of the FIG. 4a 16-point constellation to be successively transmitted.
Figure 5C:
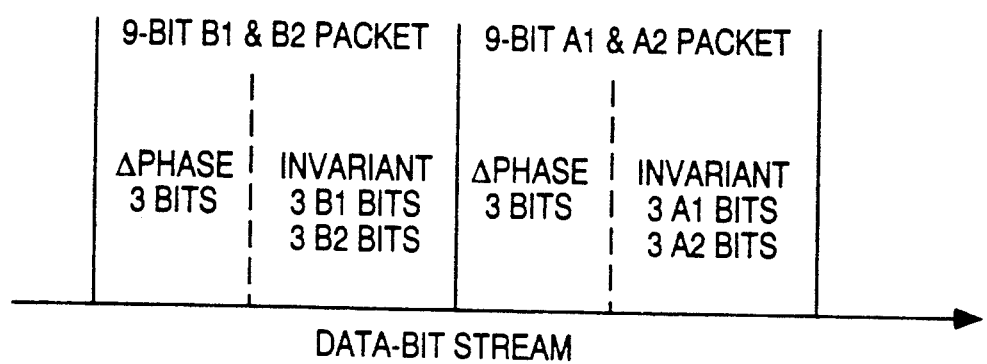
FIG. 5c illustrates the manner in which stream of information data bits applied as an input to the modified encoder of the QAM transmitter shown in FIG. 2 is divided into successive 9-bit packets for selecting a pair of consecutive points of the FIGS. 5a and 5b 32-point constellation to be successively transmitted in accordance with the encoding principles of the present invention.

Reference is now made to FIG. 4b, which shows the prior-art manner in which each of consecutive 4-bit packets of an ongoing data stream of information bits is successively applied as an input to prior art transmitter encoder 112 of FIG. 2, and to FIG. 5c, which shows the manner in which each of consecutive 9-bit packets of an ongoing data stream of information bits is successively applied as an input to a transmitter encoder employing the encoding scheme of the present invention.

Shown in FIG. 4b is a pair of consecutive packets, respectively designated 4-bit packet 1 and 4-bit packet 2, of an ongoing data bit stream. Prior art encoder 112 of FIG. 2, which employs differential encoding, is responsive to the 2 $\Delta$ phase bits and the 2 invariant bits comprising each of packets 1 and 2 for selecting that one of the 4-bit segments of the 16-point constellation of FIG. 4a which is associated with the constellation point to be transmitted by the QAM. More specifically, as known in the prior art, the information associated with each 4-bit packet defines the I, Q vector distance in the I,Q plane between the 4-bit segments associated with the preceding transmitted constellation point and the current constellation point to be transmitted by the QAM. Encoder 112 includes appropriate storage means, look-up tables and modulo 4 addition means to be able to add the 2 $\Delta$ phase bits and the 2 invariant bits of the packet associated with the current constellation point to be transmitted to the stored 4-bit segment associated with the preceding transmitted constellation point, thereby selecting the 4-bit segment associated with the current constellation point to be transmitted. Decoder 122 at the receiver of FIG. 3 employs modulo 4 subtraction means for subtracting the stored 4-bit segment associated with the preceding received constellation point from the 4-bit segment associated with the current received constellation point to restore the 2 $\Delta$ phase bits and the 2 invariant bits of the ongoing data-bit stream at the receiver.

It is plain from the above description of the prior art differential encoding scheme of FIG. 4b that the information associated with each sequential packet in the data bit stream is completely independent of one another. Therefore, this prior art encoding scheme provides no way at the receiver for detecting or correcting a transmission error in which noise causes a received I,Q point in the I,Q plane to be closer to a point in the 16-point constellation adjacent to the transmitted constellation point than it is to the transmitted constellation point itself.

A transmitter encoder of the present invention is responsive to each consecutive pair of 9-bit packets, respectively designated 9-bit A1 and A2 packet and 9-bit B1 and B2 packet, of an ongoing data bit stream. This encoder, which also employs differential encoding, is generally similar to prior art encoder 12 and 32 of FIG. 2, but differs therefrom in certain particulars. Specifically, the encoder of the present invention employs the three A1 invariant bits, together with first and third ones of the three $\Delta$ phase bits to select that 5-bit segment associated with the particular A partition constellation point, shown in FIG. 5a, which is to be first transmitted. The encoder then employs the three A2 invariant bits, together with second and third ones of the three $\Delta$ phase bits to select the particular 5-bit segment associated with the particular A partition constellation point which is to be second transmitted. The first and second ones of the three $\Delta$ phase bits correspond respectively to the higher significant phase bit of the 5-bit segments associated with the first and second transmitted A partition constellation points, while the third one of the three $\Delta$ phase bits corresponds to the lower significant phase bit of the 5-bit segments associated with both the first and second transmitted A partition constellation points. Thus, the third one of the three $\Delta$ phase bits associated with both the first and second transmitted A partition constellation points has a binary value ZERO.

In a similar manner, the encoder of the present invention employs the three B1 invariant bits, together with first and third ones of the three $\Delta$ phase bits, to select that 5-bit segment associated with the particular B partition constellation point which is to be third transmitted. The encoder then employs the three B2 invariant bits, together with second and third ones of the three $\Delta$ phase bits to select the particular 5-bit segment associated with that B partition constellation point which is to be fourth transmitted. The first and second ones of the three $\Delta$ phase bits correspond respectively to the higher significant phase bit of the 5-bit segments associated with the third and fourth transmitted B partition constellation points, while the third one of the three $\Delta$ phase bits corresponds to the lower significant phase bit of the 5-bit segments associated with both the third and fourth transmitted B partition constellation points. Thus, the third one of the three $\Delta$ phase bits associated with both the third and fourth transmitted B partition constellation points has a binary value ONE.

It should be apparent from the foregoing description of FIG. 5c that the redundant order of ongoing transmission of selected partition A and partition B constellation points of the 32-point constellation shown in FIGS. 5a and 5b is the series . . . A, A, B, B, A, A, B, B, A, A, B . . . . This redundant order of ongoing transmission, known a priori at the receiver, makes it possible for the QAM decoder at the receiver to (1) initially synchronize the receiver with the transmitter and (2) detect and correct transmission errors that may occur thereafter.

Assume that the receiver initially has no way of knowing whether each received transmission of successively received transmissions is a first, second, third or fourth transmitted transmission, and assume further that, due to transmission noise, the values of that received transmission in the I,Q plane differ from all 32 constellation points. The problem then is to decide at the receiver whether a first transmission of any given pair of two consecutive transmission is more likely to be an A partition transmission or is more likely to be a B partition transmission. The decoder at the receiver makes this decision in accordance with the following step-wise process, which may be implemented in the form of a microprocessor program.

1. Find and store the I and Q values of the closest partition A constellation point to the I and Q values of the received point in the I,Q plane of the first received transmission of the given pair. Then calculate and store the I and Q distance and phase values of the vector interconnecting the received point to the closest partition A constellation point.

2. Find and store the I and Q values of the closest partition B constellation point to the I and Q values of the received point in the I,Q plane of the first received transmission of the given pair. Then compute and store the I and Q distance and phase values of the vector interconnecting the received point to the closest partition B constellation point.

3. Find and store the I and Q values of the closest partition A constellation point to the I and Q values of the received point in the I,Q plane of the second received transmission of the given pair. Then compute and store the I and Q distance and phase values of the vector interconnecting the received point to the closest partition A constellation point.

4. Find and store the I and Q values of the closest partition B constellation point to the I and Q values of the received point in the I,Q plane of the second received transmission of the given pair. Then compute and store the I and Q distance and phase values of the vector interconnecting the received point to the closest partition B constellation point.

5. Calculate the vector sum of the partition A vectors derived in steps 1 and 3.

6. Calculate the vector sum of the partition B vectors derived in steps 2 and 4.

7. If the partition A vector sum is less than the partition B vector sum, the partition of the first received transmission of the given pair is partition A; if more than the partition B vector sum, the partition of the first received transmission of the given pair is partition B.

By applying this program to each successive pair of consecutive initial transmissions, it will be determined whether the received series of transmissions constitutes a series of repetitive AABB packets; of repetitive ABBA packets; of repetitive BBAA packets or of repetitive BAAB packets. If the repetitive packets are other than AABB packets (which is indicative of correct synchronization), the received series may be slipped accordingly to obtain (or, if synchronization has been lost, regain) correct synchronization. It is apparent that any break in the a priori known order of the series of received transmissions is indicative of a transmission error in a given transmission that should be omitted in the determining the particular constellation point transmitted in this given transmission.

The total number of different pairs of constellation points that can be transmitted, employing two consecutive prior art 4-bit packets (i.e., a total of 8 bits), shown in FIG. 4b, is $2^8$, or 256. The total number of different pairs of constellation points that can be transmitted employing either a single 9-bit A1 and A2 packet or a single 9-bit B1 and B2 packet, shown in FIG. 5c, is also $2^8$, or 256. However, the use of this one extra bit in the encoding scheme of the present invention provides a QAM transmitter and receiver system with a large amount of transmission-error resistance.

The principles of the present invention are not confined to the transmission of a repetitive series of two A partition constellation points followed by two B partition constellation points, but may be extended to a repetitive series of three or more A partition constellation points followed by three or more B partition constellation points. Further, the principles of the present invention are not confined to the 32-point constellation shown in FIGS. 5a and 5b, but may be extended to other rotationally symmetrical constellations comprising between $2^{n-1}+1$ and $2^n$ constellation points, where n is an integer having a value of at least 4. However, in all cases, the binary value of the lowest significant phase bit is used to differentiate between a constellation point belonging to an A partition and a constellation point belonging to a B partition.

What is claimed is:

1. In a video signal processing system comprising an encoder apparatus; wherein said encoder apparatus includes means for providing a bitstream of symbols representing video data, each of said symbols representing plural bits, and modulation means responsive to said symbol bitstream for producing a carrier quadrature amplitude modulated (QAM) with said symbols, said symbols being assigned to respective points at prescribed locations of a grid-like constellation in a plane defined by orthogonal I,Q axes; wherein said constellation is divided into first and second separate partitions arranged so that (a) points that are closest in distance to a point of said first partition belong to said second partition, and (b) points that are closest in distance to a point of said second partition belong to said first partition; the improvement wherein an n-bit segment having a unique binary value is assigned to each individual point of said constellation; said n-bit segment comprising (1) phase bits for distinguishing each of four rotationally symmetrical sets of constellation points situated respectively in each of four quadrants of said plane, and (2) invariant bits for distinguishing each of said constellation points in a rotationally symmetrical set; and said first and second partitions are distinguishable from each other by the lowest significant phase bit of all n-bit segments belonging to said first partition having a certain binary value, and all n-bit segments belonging to said second partition having a binary value opposite to said certain binary value.

2. Apparatus according to claim 1 wherein
each said n-bit segment comprises two phase bits and n−2 invariant bits.

3. Apparatus according to claim 2, wherein
n is an integer having a value of at least 4.

4. In a video signal processing system comprising an encoder apparatus; wherein said encoder apparatus includes means for providing a bitstream of symbols representing video data, each of said symbols representing plural bits, and modulation means responsive to said symbol bitstream for producing a carrier quadrature amplitude modulated (QAM) with said symbols, said symbols being assigned to responsive points at prescribed locations of a grid-like constellation in a plane defined by orthogonal I,Q axes; wherein said constellation is divided into first and second separate partitions arranged so that (a) points that are closest in distance to a point of said first partition belong to said second partition, and (b) points that are closest in distance to a point of said second partition belong to said first partition; the improvement wherein said first and second partitions are interleaved and exhibit a diagonal-like orientation relative to said axes.

5. Apparatus according to claim 1, wherein
n has a value of 5 and said constellation comprises 32 points in said plane.

6. In video signal transmitter apparatus comprising means including a quadrature amplitude modulator (QAM) and an encoder therefor; wherein said QAM derives any particular point in a given rotationally-symmetrical constellation of between $2^{n-1}+1$ and $2^n$ points in the in-phase (I), quadrature (Q) plane in response to that particular point being selected by said encoder in accordance with an n-segment code, where n is an integer having a value of at least 4; wherein said encoder assigns an n-bit segment having a unique binary value to each individual point of said constellation, said n-bit segment comprising (1) two phase bits for distinguishing each of four rotationally-symmetrical sets of between $2^{n-3}+1$ and $2^{n-2}$ constellation points situated respectively in each of the four quadrants of said I,Q plane in accordance with different ones of the four binary values defined by the two phase bits, and (2) $n-2$ invariant bits for distinguishing each of the constellation points in a rotationally-symmetrical set in accordance with different ones of the binary values defined by the $n-2$ invariant bits, thereby providing insensitivity to rotation of said constellation; the improvement wherein:

the bit assignment by said encoder in such that said constellation points are divided into first and second separate partitions arranged so that constellation points that are closest in distance in said I,Q plane to any constellation point of said first partition belong to said second partition, and constellation points that are closest in distance in said I,Q plane to any constellation point of said second partition belong to said first partition, said first and second partitions being distinguishable from one another by the lowest significant phase bit of all n-bit segments belonging to said first partition having a certain binary value, and all n-bit segments belonging to said second partition having a binary value opposite to said certain binary value.

7. Apparatus according to claim 6, wherein:
n has a value of 5 and said constellation comprises 32 points in the I,Q plane arranged in a 6×6 square grid defined by an array of I values between $-3$ and $+3$ and Q values between $-3$ and $+3$, with no constellation points occupying the four corner I,Q points $+3,+3$; $+3,-3$; $-3,-3$; and $-3,+3$ of the square grid, whereby said first partition comprises 16 constellation points and said second partition also comprises 16 constellation points.

8. Apparatus according to claim 7, wherein:
a bit assignment by said encoder is such that all 5-bit segments belonging to any one of either said first or second partitions lie on a diagonal of said square grid, with first-partition diagonals being interleaved with respective second-partition diagonals.

9. Apparatus according to claim 8, wherein:
said encoder divides a data stream of information bits applied thereto into consecutive 9-bit packets of said information bits in which each 9-bit packet comprises a single lowest significant phase bit;
said encoder in response to each consecutive 9-bit packet applied thereto maps that applied 9-bit packet into each of two assigned 5-bit segments that select particular constellation points defined by each of said two assigned 5-bit segments in accordance with the respective binary values of all of the 9 bits of that applied 9-bit packet; and
said bit assignment being such that the lowest significant bit of all of the assigned 5-bit segments of said first partition have a certain binary value and all of the assigned 5-bit segments of said first partition have a binary value opposite to said certain binary value;
whereby both of the two selected constellation points belong to that one of said first and second partitions determined by the binary value of said single lowest significant phase bit.

10. Apparatus according to claim 9, wherein:
said encoder employs differential encoding in the mapping of said applied 9-bit packet of information bits into each of said two assigned 5-bit segments.

11. Apparatus according to claim 9, wherein:
respective binary values of said single lowest significant phase bit of each applied 9-bit packet of each successive phase of said consecutive 9-bit packets are opposite from one another.

12. Apparatus according to claim 11, wherein:
said encoder employs differential encoding in the mapping of each applied 9-bit packet of each successive pair of said consecutive 9-bit packets of information bits into each of said two assigned 5-bit segments of that applied 9-bit packet.

13. In video signal receiver apparatus for receiving a transmitted signal that has been encoded by a quadrature-amplitude-modulator (QAM) at the transmitter of said signal in accordance with a given code; said receiver comprising digital means for demodulating and decoding said received signal transmitted thereto; wherein each of a given pair of first and second particular points in a given rotationally-symmetrical constellation of between $2^{n-1}+1$ and $2^n$ points in a plane defined by in-phase (I) and quadrature phase (Q) axes, where n is an integer having a value of at least 4, are respectively selected at the transmitter for consecutive first and second transmissions to said receiver in accordance with said given code; wherein said constellation points are divided in accordance with said given code into separate first partition points and second partition points arranged so that constellation points that are closest in distance in said I,Q plane to any constellation point of said first partition belong to said second partition and constellation points that are closest in distance in said I,Q plane to any constellation point of said second partition belong to said first partition; and wherein said decoding means includes digital means for deciding, in accordance with the following process, whether a first of a pair of first and second constellation points in the I, Q plane consecutively received by said receiver is a first-partition constellation point or a second-partition constellation point:

1. Store the I and Q values of the closest first-partition constellation point to the I and Q values of the received point in the I,Q plane of the first received transmission of the given pair; calculate and store the I and Q distance and phase values of the vector interconnecting the received point to the closest first-partition constellation point;

2. Store the I and Q values of the closest second-partition constellation point to the I and Q values of the received point in the I,Q plane of the first received transmission of the given pair; compute and store the I and Q distance and phase values of the vector interconnecting the received point to the closest second-partition constellation point;

3. Store the I and Q values of the closest first-partition constellation point to the I and Q values of the received point in the I,Q plane of the second received transmission of the given pair; compute and store the I and Q distance and phase values of the vector interconnecting the received point to the closest partition first-partition constellation point;

4. Store the I and Q values of the closest second-partition constellation point to the I and Q values of the received point in the I,Q plane of the second received transmission of the given pair; compute and store the I and Q distance and phase values of the vector interconnecting the received point to the closest second-partition constellation point;

5. Calculate the vector sum of the first-partition vectors derived in steps 1 and 3;

6. Calculate the vector sum of the second-partition vectors derived in steps 2 and 4;

7. Compare the first partition vector sum with second partition vector sum to determine (A) if the first partition vector sum is less than the second partition vector sum whereby the partition of the first received transmission of the given pair is the first partition, or (B) if the first partition vector sum is more than the second partition vector sum whereby the partition of the first received transmission of the given pair is in the second partition.

14. A receiver according to claim 13, wherein:
said given code divides successive transmissions from said transmitter into repetitive series of a given plurality of first-partition constellation points followed by said given plurality of second-partition constellation points; and
said decoder at said receiver includes digital means responsive to the order of first-partition and second-partition constellation points, as decided by said process, of successive received transmissions from said transmitter for detecting transmission errors in said received repetitive series.

15. A receiver according to claim 14, wherein:
said given plurality is two.

16. A receiver according to claim 14, wherein:
said decoder at said receiver includes digital means responsive to the detection of received transmission errors in said repetitive series for correcting said transmission errors.

17. A receiver according to claim 16, wherein:
said given plurality is two.

* * * * *